United States Patent
Baumgartner et al.

(10) Patent No.: US 6,275,907 B1
(45) Date of Patent: Aug. 14, 2001

(54) RESERVATION MANAGEMENT IN A NON-UNIFORM MEMORY ACCESS (NUMA) DATA PROCESSING SYSTEM

(75) Inventors: Yoanna Baumgartner, Austin; Gary Dale Carpenter, Pflugerville; Mark Edward Dean, Austin; Anna Elman, Austin; James Stephen Fields, Jr., Austin; David Brian Glasco, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/184,395

(22) Filed: Nov. 2, 1998

(51) Int. Cl.[7] ....................................................... G06F 12/08
(52) U.S. Cl. ........................... 711/143; 711/119; 711/120; 711/122; 711/144; 711/145; 711/121
(58) Field of Search ..................................... 711/119, 120, 711/122, 143, 144, 145, 148, 153, 121, 156

(56) References Cited

U.S. PATENT DOCUMENTS 5,742,785 * 4/1998 Stone et al. ........................... 712/217
5,784,697 * 7/1998 Funk et al. ........................... 711/170
6,073,211 * 6/2000 Cheng et al. ........................ 711/122

* cited by examiner

Primary Examiner—Hiep T. Nguyen
(74) Attorney, Agent, or Firm—Casimer K. Salys; Bracewell & Patterson, L.L.P.

(57) ABSTRACT

A non-uniform memory access (NUMA) computer system includes a plurality of processing nodes coupled to a node interconnect. The plurality of processing nodes include at least a remote processing node, which contains a processor having an associated cache hierarchy, and a home processing node. The home processing node includes a shared system memory containing a plurality of memory granules and a coherence directory that indicates possible coherence states of copies of memory granules among the plurality of memory granules that are stored within at least one processing node other than the home processing node. If the processor within the remote processing node has a reservation for a memory granule among the plurality of memory granules that is not resident within the associated cache hierarchy, the coherence directory associates the memory granule with a coherence state indicating that the reserved memory granule may possibly be held non-exclusively at the remote processing node. In this manner, the coherence mechanism can be utilized to manage processor reservations even in cases in which a reserving processor's cache hierarchy does not hold a copy of the reserved memory granule.

19 Claims, 6 Drawing Sheets

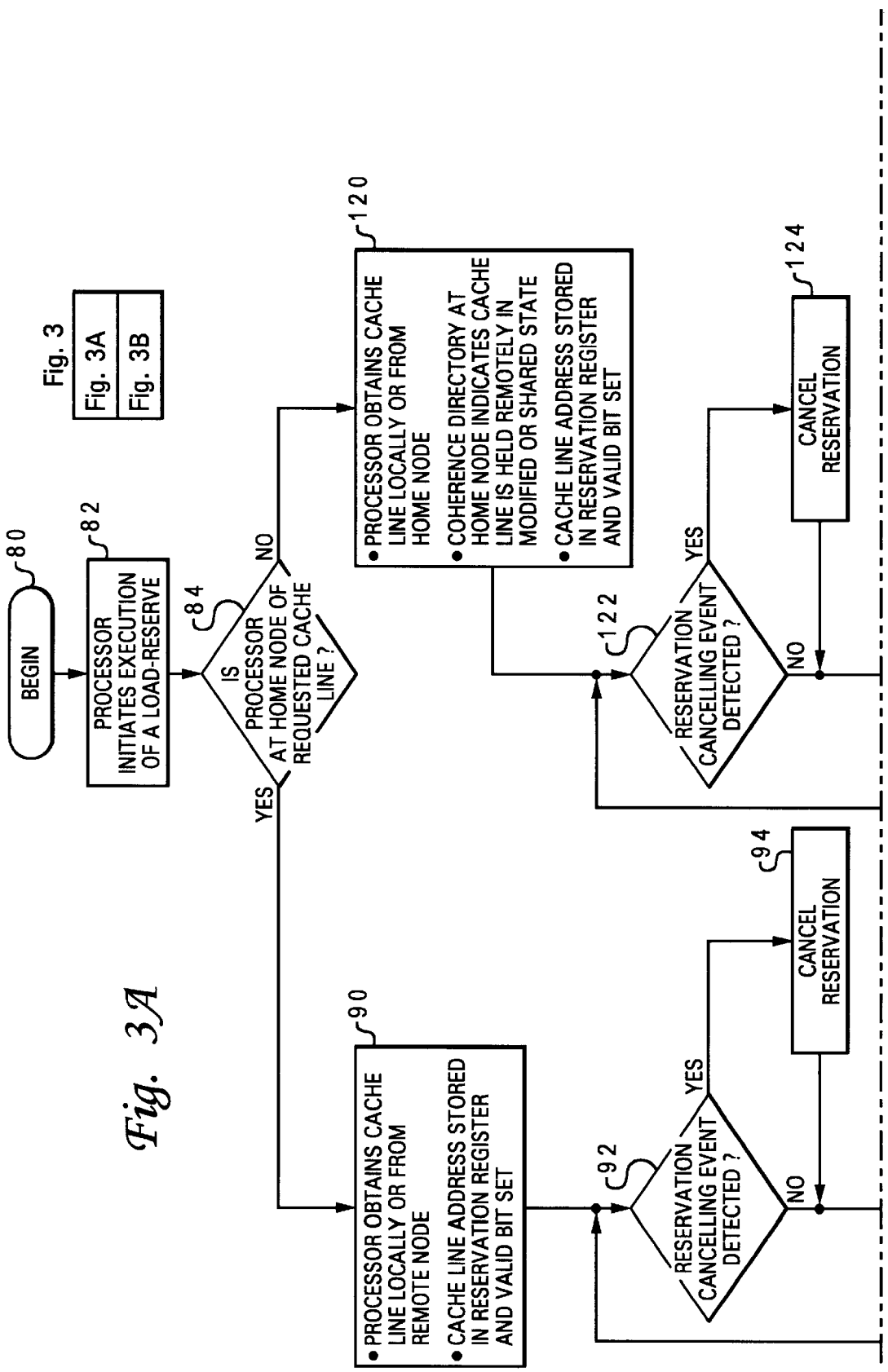

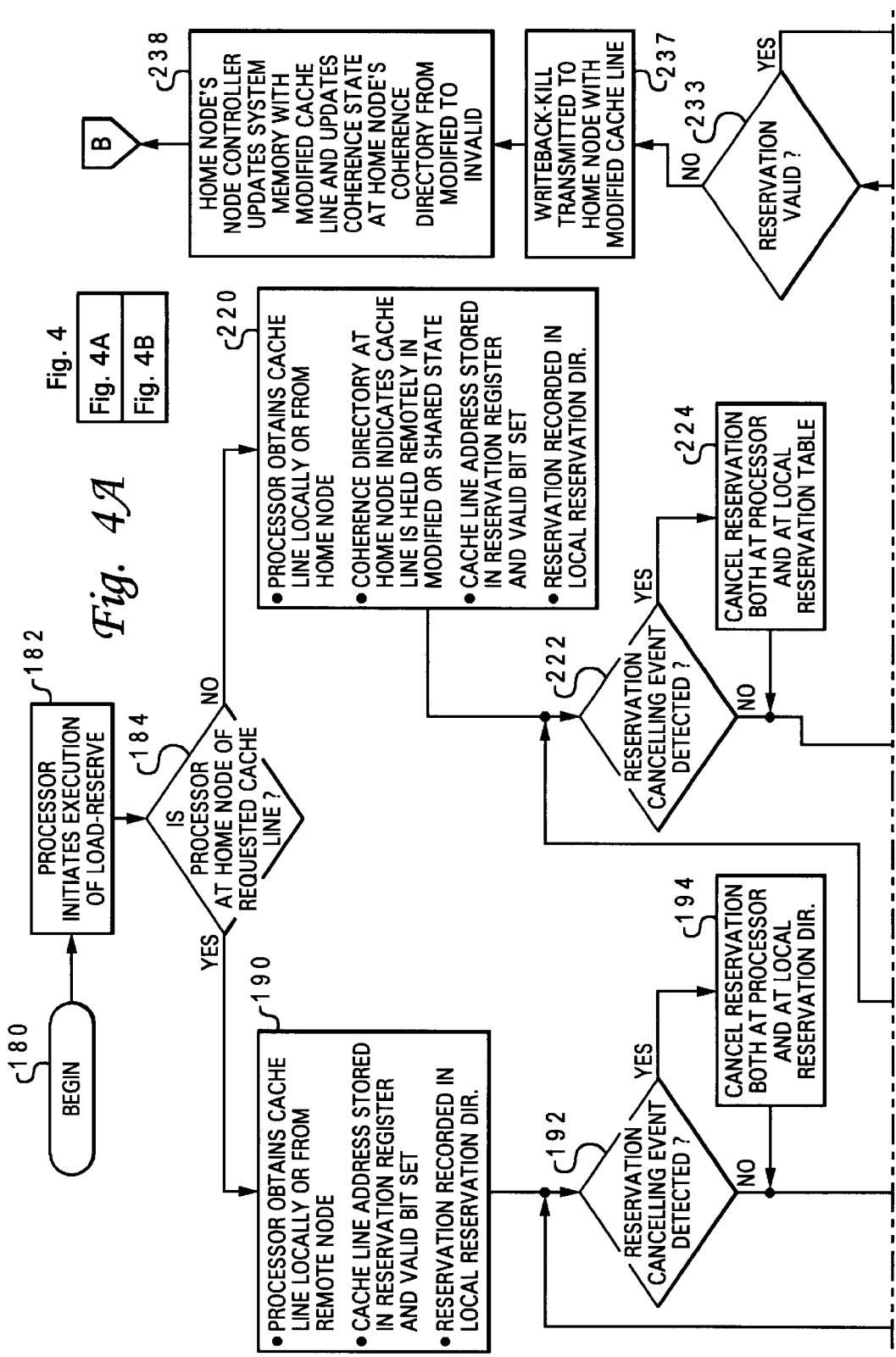

RESERVATION MANAGEMENT IN A NON-UNIFORM MEMORY ACCESS (NUMA) DATA PROCESSING SYSTEM

BACKGROUND OF THE INVENTION

1. Technical Field

The present invention relates in general to a method and system for data processing and, in particular, to data processing within a non-uniform memory access (NUMA) data processing system. Still more particularly, the present invention relates to a NUMA data processing system and method of reservation management in a NUMA data processing system.

2. Description of the Related Art

In shared memory multiprocessor (MP) data processing systems, each of the multiple processors in the system may access and modify data stored in the shared memory. In order to synchronize access to a particular granule (e.g., cache line) of memory between multiple processors, load-reserve and store-conditional instructions are often employed. For example, load-reserve and store-conditional instructions have been implemented in the PowerPC™ instruction set architecture with opcodes associated with the LARX and STCX mnemonics, respectively.

In bus-based shared memory MP data processing systems that support load-reserve and store-conditional instructions, each processor within the system is equipped with a reservation register. When a processor executes a load-reserve to a memory granule, the processor loads some or all of the contents of the memory granule into one of the processor's internal registers and the address of the memory granule into the processor's reservation register. The requesting processor is then said to have a reservation with respect to the memory granule. The processor may then perform an atomic update to the reserved memory granule utilizing a store-conditional instruction.

When a processor executes a store-conditional to a memory granule for which the processor holds a reservation, the processor stores the contents of a designated register to the memory granule and then clears the reservation. If the processor does not have a reservation for the memory granule, the store-conditional instruction fails and the memory update is not performed. In general, the processor's reservation is cleared if a remote processor requests exclusive access to the memory granule for purposes of modifying it (the request is made visible to all processors on the shared bus) or the reserving processor executes a store-conditional instruction. If only one reservation is permitted per processor, a processor's current reservation will also be cleared if the processor executes a load-reserve to another memory granule.

Recently, there has been increased interest in a shared memory MP architecture known as non-uniform memory access (NUMA). A typical NUMA system includes a number of processing nodes, each containing one or more processors, a local system memory, and other devices coupled to a local interconnect. The processing nodes are interconnected by a relatively high latency node interconnect. Because store operations performed by a processor in one processing node are not necessarily made visible to all other processors in a NUMA system, the reservation management techniques utilized in shared-bus MP data processing systems cannot be directly applied to NUMA computer systems. Consequently, in NUMA computer systems, a global reservation directory has been employed within each processing node to maintain reservations of all processors within the system for memory granules in the local system memory. This global implementation of reservation management is somewhat problematical because as additional processing nodes are added to the NUMA computer system, the number of processors can exceed the size of the global reservation directory at each processing node. In addition, it is desirable to permit the processing nodes to support diverse numbers of processors and different processor configurations; however, it may be difficult to number or tag diverse processors in a consistent manner across all processing nodes so that the processors' reservations can be appropriately tracked in the global reservation directories.

As should thus be apparent, it would be useful and desirable to provide a NUMA computer system having an improved method and system for reservation management.

SUMMARY OF THE INVENTION

In accordance with the present invention, a non-uniform memory access (NUMA) computer system includes a plurality of processing nodes coupled to a node interconnect. The plurality of processing nodes include at least a remote processing node, which contains a processor having an associated cache hierarchy, and a home processing node. The home processing node includes a shared system memory containing a plurality of memory granules (e.g., cache lines) and a coherence directory that indicates possible coherence states of copies of memory granules among the plurality of memory granules that are stored within at least one processing node other than the home processing node.

In the course of executing instructions, the processor within the remote processing node may execute a load-reserve instruction, which causes a specified cache line to be loaded into the processor's cache hierarchy and a reservation for the cache line to be set within the processor. If the processor subsequently loads a number of cache lines that map to the same congruence class of the cache hierarchy that contains the reserved cache line, the reserved cache line may be castout through conventional cache line replacement. The reservation is not affected by the replacement of the reserved cache line. According to the present invention, if the processor within the remote processing node has a reservation for a cache line that is not resident within its associated cache hierarchy, the coherence directory at the home processing node associates the cache line with a coherence state indicating that the reserved cache line may possibly be held non-exclusively at the remote processing node. In this manner, the cache coherence mechanism can be utilized to manage processor reservations even in cases in which a reserving processor's cache hierarchy does not hold a copy of the reserved cache line.

The coherence state of the reserved cache line is set to the non-exclusive (e.g., shared) state in response to a writeback transaction transmitted from the remote processing node to the home processing node. In an embodiment of the present invention in which all cache line reservations are made visible (i.e., a processor cannot obtain a "silent" reservation for a cache line resident in its cache hierarchy), the replacement of a reserved cache line causes the reserving processor to issue a writeback-kill transaction indicating that the coherence indicator at the home processing node should be updated to an invalid state. In response to receipt of such a writeback-kill transaction while the reservation is valid, a node controller at the remote processing node converts the writeback transaction to a writeback-clean transaction, thereby indicating that the coherence indicator should be updated to the non-exclusive (e.g., shared) state.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
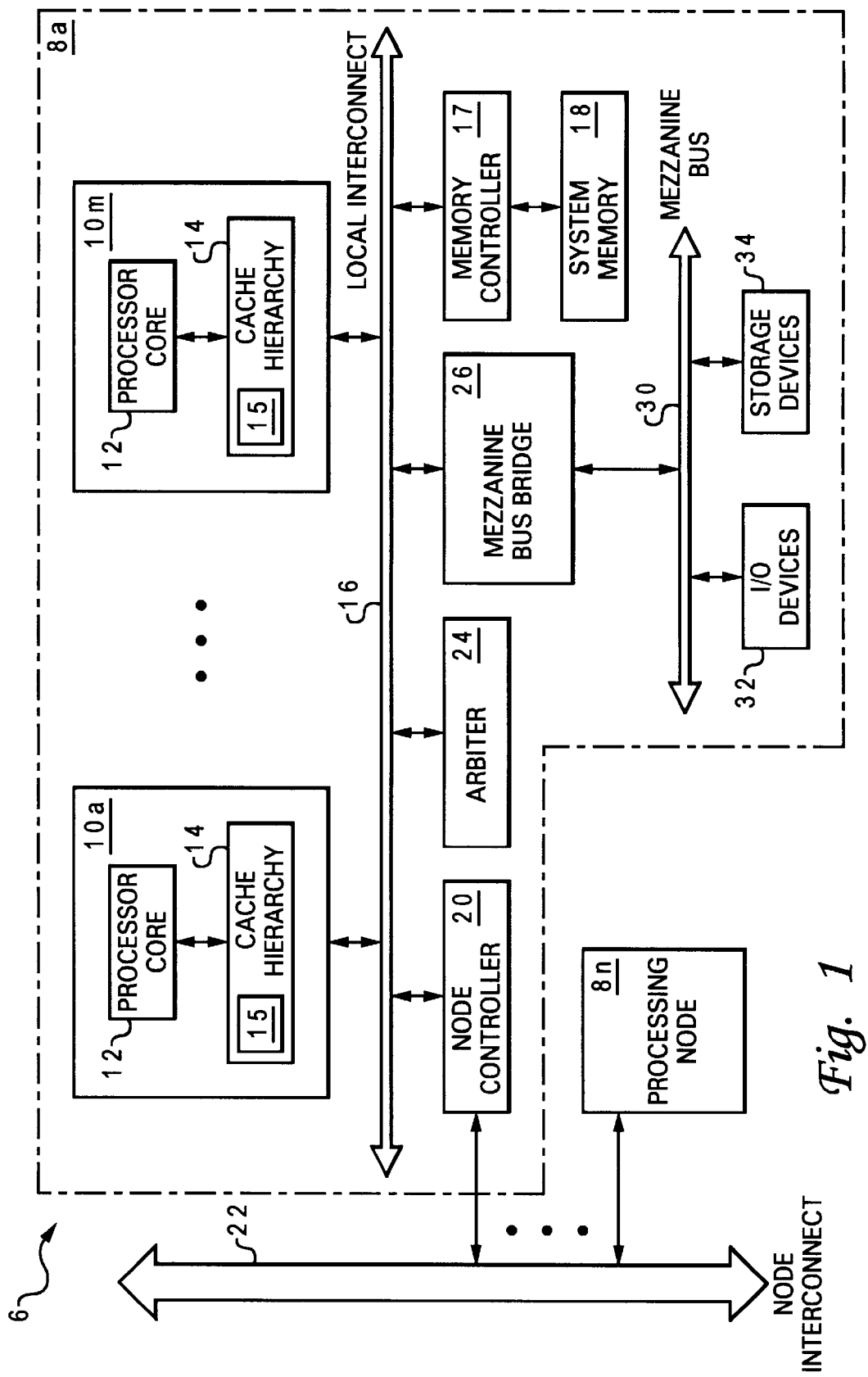
FIG. 1 depicts an illustrative embodiment of a NUMA computer system in accordance with the present invention.

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 6 includes a number (N≧2) of processing nodes 8a–8n, which are interconnected by node interconnect 22. Processing nodes 8a–8n may each include M (M≧0) processors 10, a local interconnect 16, and a system memory 18 that is accessed via a memory controller 17. Processors 10a–10m are preferably (but not necessarily) identical and may comprise a processor within the PowerPC™ line of processors available from International Business Machines (IBM) Corporation of Armonk, N.Y. In addition to the registers, instruction flow logic and execution units utilized to execute program instructions, which are generally designated as processor core 12, each of processors 10a–10m also includes an on-chip cache hierarchy that is utilized to stage data to the associated processor core 12 from system memories 18. Each cache hierarchy 14 may include, for example, a level one (L1) cache and a level two (L2) cache having storage capacities of between 8–32 kilobytes (kB) and 1–16 megabytes (MB), respectively.

To support reservations, each processor 10 includes a reservation register 15, illustrated in the embodiment of FIG. 1 as a portion of cache hierarchy 14. Reservation register 15 preferably contains an address field for storing the physical address of a memory granule for which the associated processor 10 may have a reservation and a valid bit for indicating whether or not the processor 10 holds a reservation for the memory granule located at the physical address contained within the address field. Like conventional processors, a processor 10 obtains a reservation for a memory granule by executing a load-reserve instruction, which, in addition to loading a specified memory granule (or subset thereof) into a register in processor core 12 and its associated L1 cache, loads the physical address of the memory granule into the address field of reservation register 15 and sets the valid bit. A processor's reservation for a memory granule is cleared by a number of events, including execution by the reserving processor 10 of a load-reserve specifying a different memory granule, execution by the reserving processor 10 or another processor 10 of a cache operation that invalidates the copy of the memory granule held in cache hierarchy 14, and snooping a "read with intent to modify" (RWITM) request transaction on local interconnect 16 in which another processor 10 requests exclusive access to the reserved memory granule for the purposes of modifying it.

As shown, each of processing nodes 8a–8n further includes a respective node controller 20 coupled between local interconnect 16 and node interconnect 22. Each node controller 20 serves as a local agent for remote processing nodes 8 by performing at least two functions. First, each node controller 20 snoops the associated local interconnect 16 and facilitates the transmission of local communication transactions to remote processing nodes 8. Second, each node controller 20 snoops communication transactions on node interconnect 22 and masters relevant communication transactions on the associated local interconnect 16. Communication on each local interconnect 16 is controlled by an arbiter 24. Arbiters 24 regulate access to local interconnects 16 based on bus request signals generated by processors 10 and compile coherency responses for snooped communication transactions on local interconnects 16, as discussed further below.

Local interconnect 16 is coupled, via mezzanine bus bridge 26, to a mezzanine bus 30, which may be implemented as a Peripheral Component Interconnect (PCI) local bus, for example. Mezzanine bus bridge 26 provides both a low latency path through which processors 10 may directly access devices among I/O devices 32 and storage devices 34 that are mapped to bus memory and/or I/O address spaces and a high bandwidth path through which I/O devices 32 and storage devices 34 may access system memory 18. I/O devices 32 may include, for example, a display device, a keyboard, a graphical pointer, and serial and parallel ports for connection to external networks or attached devices. Storage devices 34, on the other hand, may include optical or magnetic disks that provide non-volatile storage for operating system and application software.

Memory Organization

All of processors 10 in NUMA computer system 6 share a single physical memory space, meaning that each physical address is associated with only a single location in one of system memories 18. Thus, the overall contents of the system memory, which can generally be accessed by any processor 10 in NUMA computer system 6, can be viewed as partitioned between system memories 18. For example, in an illustrative embodiment of the present invention having four processing nodes 8, NUMA computer system may have a 16 gigabyte (GB) physical address space including both a general purpose memory area and a reserved area. The general purpose memory area is divided into 500 MB segments, with each of the four processing nodes 8 being allocated every fourth segment. The reserved area, which may contain approximately 2 GB, includes system control and peripheral memory and I/O areas that are each allocated to a respective one of processing nodes 8.

For purposes of the present discussion, the processing node 8 that stores a particular datum in its system memory 18 is said to be the home node for that datum; conversely, others of processing nodes 8a–8n are said to be remote nodes with respect to the particular datum.

Memory Coherency

Because data stored within each system memory 18 can be requested, accessed, and modified by any processor 10 within NUMA computer system 6, NUMA computer system 6 implements a cache coherence protocol to maintain coherence both between caches in the same processing node and between caches in different processing nodes. Thus, NUMA computer system 6 is properly classified as a CC-NUMA computer system. The cache coherence protocol that is implemented is implementation-dependent and may comprise, for example, the well-known Modified, Exclusive, Shared, Invalid (MESI) protocol or a variant thereof. Hereafter, it will be assumed that cache hierarchies 14 and arbiters 24 implement the conventional MESI protocol, of which node controllers 20 recognize the M, S and I states and consider the E state to be merged into the M state for correctness. That is, node controllers 20 assume that data held exclusively by a remote cache has been modified, whether or not the data has actually been modified.

Interconnect Architecture

Local interconnects 16 and node interconnect 22 can each be implemented with any bus-based broadcast architecture, switch-based broadcast architecture, or switch-based non-broadcast architecture. However, in a preferred embodiment, at least node interconnect 22 is implemented as a switch-based non-broadcast interconnect governed by the 6xx communication protocol developed by IBM Corporation. Local interconnects 16 and node interconnect 22 permit split transactions, meaning that no fixed timing relationship exists between the address and data tenures comprising a communication transaction and that data packets can be ordered differently than the associated address packets. The utilization of local interconnects 16 and node interconnect 22 is also preferably enhanced by pipelining communication transactions, which permits a subsequent communication transaction to be sourced prior to the master of a previous communication transaction receiving coherency responses from each recipient.

Regardless of the type or types of interconnect architecture that are implemented, at least three types of "packets" (packet being used here generically to refer to a discrete unit of information)—address, data, and coherency response—are utilized to convey information between processing nodes 8 via node interconnect 22 and between snoopers via local interconnects 16. Referring now to Tables I and II, a summary of relevant fields and definitions are given for address and data packets, respectively.

TABLE I

| Field Name | Description |
| --- | --- |
| Address <0:7> | Modifiers defining attributes of a communication transaction for coherency, write thru, and protection |
| Address <8:15> | Tag used to identify all packets within a communication transaction |
| Address <16:63> | Address portion that indicates the physical, virtual or I/O address in a request |
| AParity <0:2> | Indicates parity for address bits <0:63> |
| TDescriptors | Indicate size and type of communication transaction |

TABLE II

| Field Name | Description |
| --- | --- |
| Data <0:127> | Data for read and write transactions |
| Data parity <0:15> | Indicates parity for data lines <0:127> |
| DTag <0:7> | Tag used to match a data packet with an address packet |
| DValid <0:1> | Indicates if valid information is present in Data and DTag fields |

As indicated in Tables I and II, to permit a recipient node or snooper to determine the communication transaction to which each packet belongs, each packet in a communication transaction is identified with a transaction tag. Those skilled in the art will appreciate that additional flow control logic and associated flow control signals may be utilized to regulate the utilization of the finite communication resources.

Within each processing node 8, coherency responses are communicated between each snooper and the local arbiter 24. The signal lines within local interconnects 16 that are utilized for coherency communication are summarized below in Table III.

TABLE III

| Signal Name | Description |
| --- | --- |
| AStatOut <0:1> | Encoded signals asserted by each bus receiver to indicate flow control or error information to arbiter |
| AStatIn <0:1> | Encoded signals asserted by arbiter in response to tallying the AStatOut signals asserted by the bus receivers |
| ARespOut <0:2> | Encoded signals asserted by each bus receiver to indicate coherency information to arbiter |
| ARespIn <0:2> | Encoded signals asserted by arbiter in response to tallying the ARespOut signals asserted by the bus receivers |

Coherency responses transmitted via the AResp and AStat lines of local interconnects 16 preferably have a fixed but programmable timing relationship with the associated address packets. For example, the AStatOut votes, which provide a preliminary indication of the response of each snooper to an address packet on local interconnect 16, may be required in the second cycle following receipt of the address packet. Arbiter 24 compiles the AStatOut votes and then issues the AStatIn vote a fixed but programmable number of cycles later (e.g., 1 cycle). Possible AStat votes are summarized below in Table IV.

TABLE IV

| AStat vote | Meaning |
| --- | --- |
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed in Table V.

TABLE V

| Coherency responses | Meaning |
| --- | --- |
| Retry | Source of request must retry transaction -- usually for flow control reasons |
| Modified intervention | Line is modified in cache and will be sourced to requestor |
| Shared | Line is held shared in cache |
| Null | Line is invalid in cache |
| ReRun | Snooped request has long latency and source of request will be instructed to reissue transaction at a later time |

The ReRun AResp vote, which is usually issued by a node controller 20, indicates that the snooped request has a long latency and that the source of the request will be instructed to reissue the transaction at a later time. Thus, in contrast to a Retry AResp vote, a ReRun makes the recipient of a transaction that voted ReRun (and not the originator of the transaction) responsible for causing the communication transaction to be reissued at a later time.

Node Controller

Figure 2:
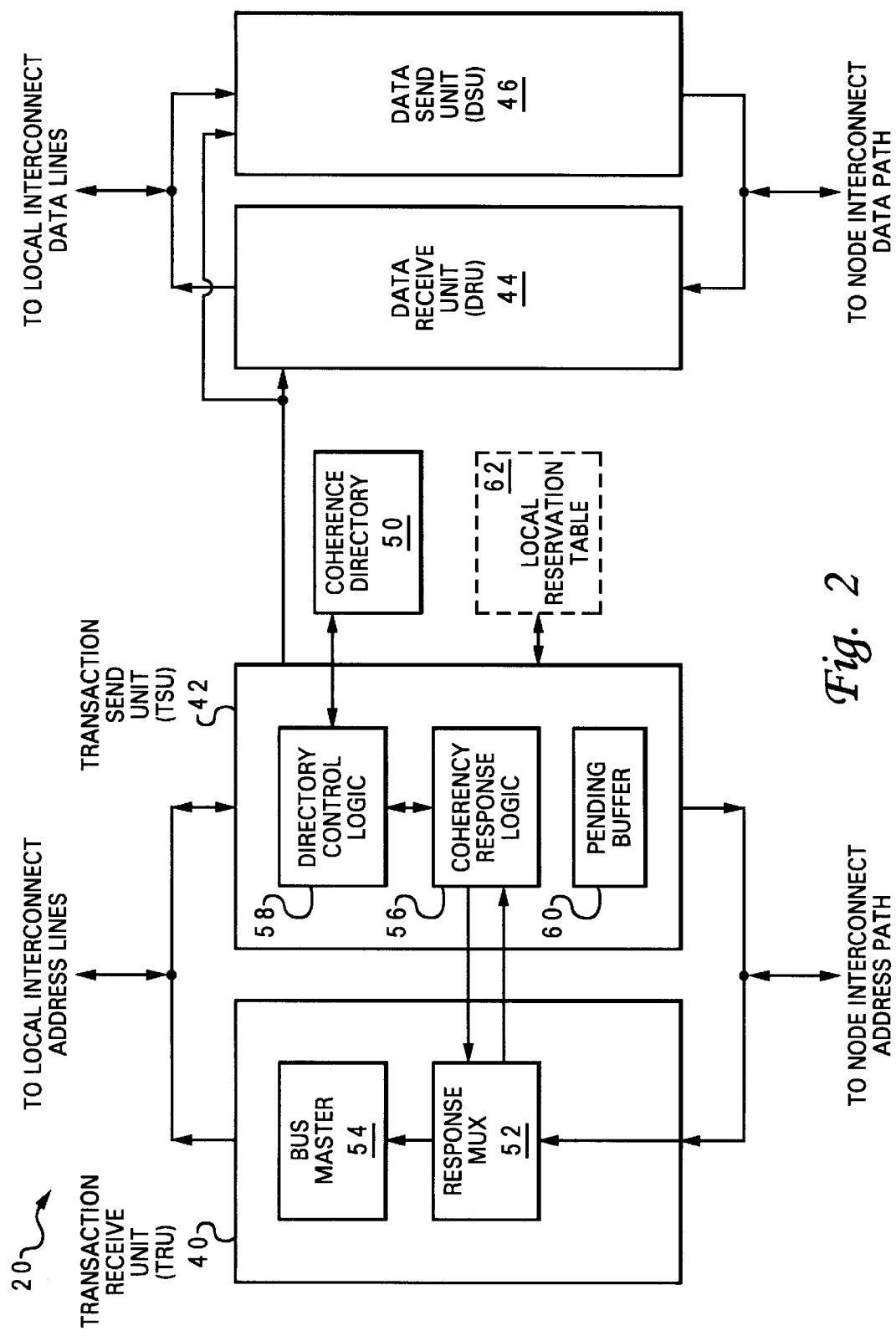
FIG. 2 is a more detailed block diagram of the node controller shown in FIG. 1.

Referring now to FIG. 2, there is illustrated a more detailed block diagram of a node controller 20 in NUMA computer system 6 of FIG. 1. As shown in FIG. 2, each node controller 20, which is coupled between a local interconnect 16 and node interconnect 22, includes a transaction receive unit (TRU) 40, a transaction send unit (TSU) 42, a data receive unit (DRU) 44, and a data send unit (DSU) 46. TRU 40, TSU 42, DRU 44 and DSU 46 can be implemented, for example, with field programmable gate arrays (FPGAs) or application specific integrated circuits (ASICs). As indicated, the address and data paths through node controller 20 are bifurcated, with address (and coherency) packets being processed by TRU 40 and TSU 42 and data packets being processed by DSU 44 and DRU 46.

TRU 40, which is so designated to indicate transaction flow off of node interconnect 22, is responsible for accepting address and coherency packets from node interconnect 22, issuing transactions on local interconnect 16, and forwarding responses to TSU 42. TRU 40 includes response multiplexer (mux) 52, which receives packets from node interconnect 22 and passes selected packets to both bus master 54 and coherency response logic 56 within TSU 42. In response to receipt of a address packet from response multiplexer 52, bus master 54 can initiate a communication transaction on its local interconnect 16 that is the same as or different from the type of communication transaction indicated by the received address packet.

TSU 42, which as indicated by its nomenclature is a conduit for transactions flowing onto node interconnect 22, includes a multiple-entry pending buffer 60 that temporarily stores attributes of communication transactions sourced onto node interconnect 22 that have yet to be completed. The transaction attributes stored in an entry of pending buffer 60 preferably include at least the address (including tag) of the transaction, the type of the transaction, and the number of expected coherency responses. Each pending buffer entry has an associated status, which can be set either to Null, indicating that the pending buffer entry can be deleted after all expected responses have been received, or to ReRun, indicating that the transaction is still pending. In addition to sourcing address packets on node interconnect 22, TSU 42 interacts with TRU 40 to process memory request transactions and issues commands to DRU 44 and DSU 46 to control the transfer of data between local interconnect 16 and node interconnect 22. TSU 42 also implements the selected (i.e., MSI) coherency protocol for node interconnect 22 with coherency response logic 56 and maintains coherence directory 50 with directory control logic 58.

Coherence directory 50 stores indications of the system memory addresses of data (e.g., cache lines) checked out to caches in remote nodes for which the local processing node is the home node. The address indication for each cache line is stored in association with an identifier of each remote processing node having a copy of the cache line and the coherency status of the cache line at each such remote processing node. Possible coherency states for entries in coherency directory 50 are summarized in Table VI.

TABLE VI

| Coherence directory state | Possible state(s) in local cache | Possible state(s) in remote cache | Meaning |
| --- | --- | --- | --- |
| Modified (M) | I | M,E, or I | Cache line may be modified at a remote node with respect to system memory at home node |
| Shared (S) | S or I | S or I | Cache line may be held non-exclusively at remote node |
| Invalid (I) | M,E,S, or I | I | Cache line is not held by any remote node |
| Pending-shared | S or I | S or I | Cache line is in the process of being invalidated at remote nodes |
| Pending-modified | I | M,E, or I | Cache line, which may be modified remotely, is in process of being written back to system memory at home node, possibly with invalidation at remote node |

As indicated in Table VI, the knowledge of the coherency s states of cache lines held by remote processing nodes is imprecise. This imprecision is due to the fact that a cache line held remotely can make a transition from S to I, from E to I, or from E to M without notifying the node controller 20 of the home node. In accordance with the present invention and as explained in greater detail below, the coherency states maintained in coherence directory 50 are also utilized to manage reservations in NUMA computer system 6.

As shown in FIG. 2, in certain embodiments of the present invention, each node controller 20 may also optionally include a local reservation table 62. Each local reservation table 62 stores the base addresses of cache lines for which local processors 10 hold reservations. Unlike prior art global reservation directories, local reservation tables 62 do not maintain reservations for processors 10 in remote nodes.

Reservation Management

Figure 3B:
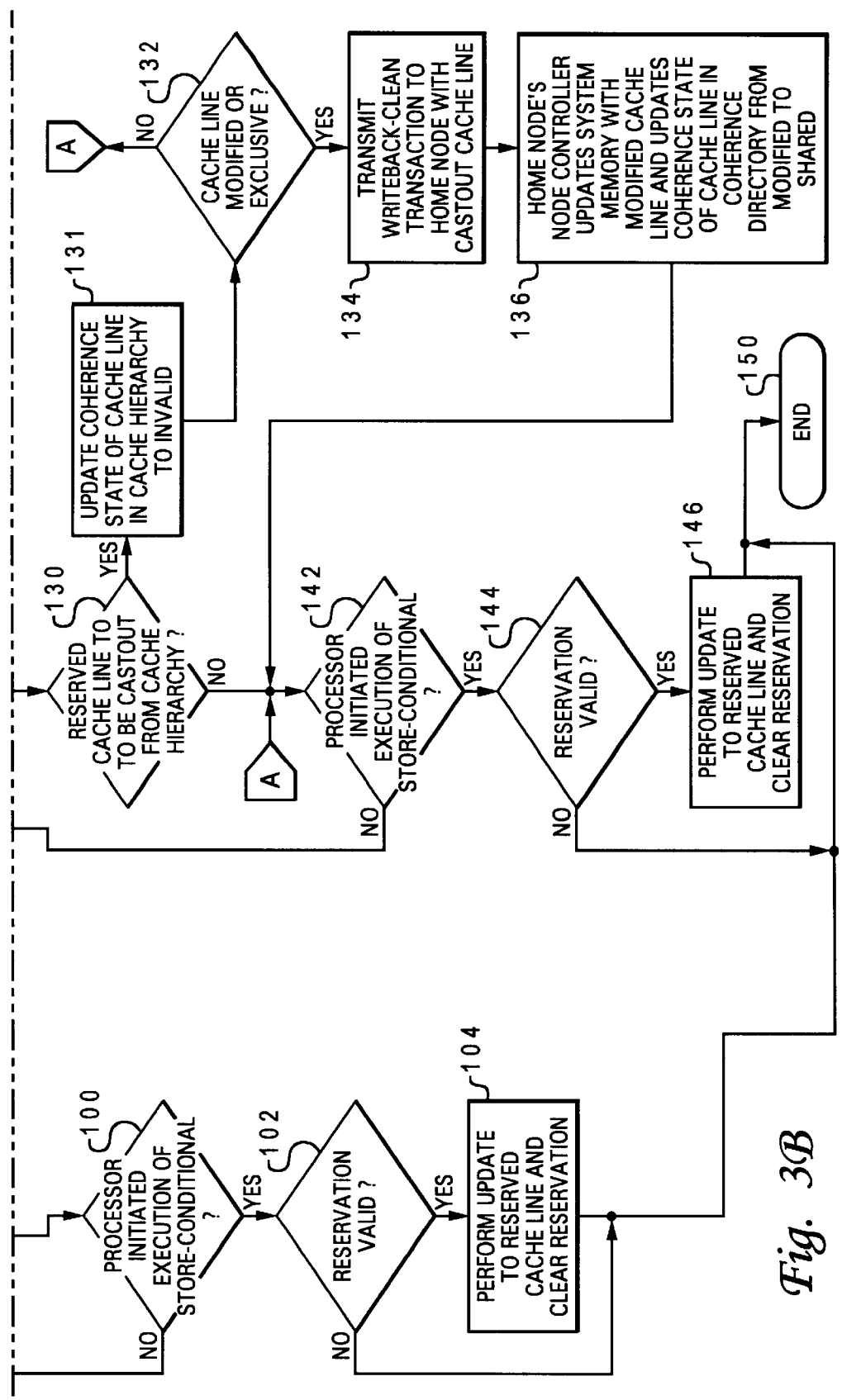
FIG. 3 is a high level logical flowchart of a first exemplary reservation management method in accordance with the present invention.

With reference now to FIG. 3, there is depicted a high level logical flowchart of a first illustrative embodiment of a method for managing reservations in a NUMA computer system in accordance with the present invention. In this first illustrative embodiment, node controllers 20 do not include local reservation tables 62, and processor 10 are permitted to obtain "silent" reservations (i.e., to reserve cache lines resident within their cache hierarchies 14 without notifying any other processors 10).

As illustrated, the process begins at block 80 and thereafter proceeds to block 82, which illustrates a processor 10 initiating execution of a load-reserve instruction. As indicated at block 84, if the processor 10 that executes the load-reserve instruction (hereinafter, called reserving processor 10) is located within the home node of the cache line targeted by the load-reserve instruction, the process passes to blocks 90–104; alternatively, if the home node of the cache line targeted by the load-reserve instruction is a remote processing node 8, the process passes to blocks 120–150.

Referring now to block 90, execution of the load-reserve instruction entails a number of steps. First, processor core 12 of reserving processor 10 requests the cache line specified by the load-reserve instruction from its cache hierarchy 14, which may in turn place a request for the cache line on local interconnect 16 if the request for the cache line misses in cache hierarchy 14. If the requested cache line does not reside in the cache hierarchy 14 associated with reserving processor 10 and a request transaction is accordingly issued on local interconnect 16, all snoopers coupled to local interconnect 16 issue a coherency response to the request transaction, as detailed above. In order to determine an appropriate coherency response to the request transaction by node controller 20, TSU 42 determines if coherence directory 50 indicates that the requested cache line is checked out to a remote processing node 8 in modified state. If not, the requested cache line can be obtained locally. However, if coherence directory 50 indicates the requested cache line is checked out to a remote processing node 8 in Modified state, TSU 42 replies to the request transaction on local interconnect 16 with a AResp ReRun coherency response and issues a request for the cache line to the remote processing node 8 via node interconnect 22. The remote processing node 8 will respond to the request by supplying the requested cache line to node controller 20, which will source the requested cache line to reserving processor 10 in response to the request transaction being reissued on local interconnect 16. Regardless of whether the requested cache line is obtained locally or from a remote processing node 8, once the requested cache line is supplied to cache hierarchy 14 of reserving processor 10, the requested cache line (or a subset thereof) is then loaded into a register within processor core 12. In addition, the base address of the cache line is stored within the address field of the requesting processor's reservation register 15, and the valid bit is set to indicate that the processor has a reservation for the requested cache line.

Following execution of the load-reserve instruction at block 90, the process proceeds to block 92, which illustrates a determination of whether or not reserving processor 10 has detected an event that would cancel the reservation. As noted above, the events that will cancel a reservation can include the execution by reserving processor 10 of a load-reserve targeting a different (i.e., unreserved) cache line, snooping a store or other transaction (e.g., read with intent to modify (RWITM)) on local interconnect 16 that modifies or indicates an intent to modify the reserved cache line, and execution by reserving processor 10 or a remote processor 10 of certain cache line invalidating instructions targeting the reserved cache line. If a reservation cancelling event is detected by reserving processor 10, the process proceeds to block 94, which depicts reserving processor 10 cancelling its reservation by resetting the valid bit within it s reservation register 15. The process then passes to block 100. if, on the other hand, a determination is made at block 92 that a reservation cancelling event has not been detected, the process proceeds directly to block 100.

Block 100 illustrates a determination of whether or not the reserving processor 10 has initiated execution of a store-conditional instruction. If not, the process returns to block 92, which has been described. If, however, reserving processor 10 has initiated execution of a store-conditional instruction, reserving processor 10 determines by reference to its reservation register 15 whether or not it holds a valid reservation for the cache line specified by the store-conditional instruction. If not, the store-conditional fails, and the process terminates at block 150. If, on the other hand, the reserving processor 10 has a valid reservation for the cache line specified by the store-conditional instruction, the process proceeds from block 102 to block 104. Block 104 illustrates reserving processor 10 updating the reserved cache line (once exclusive access to the reserved cache line is assured) by storing the contents of a specified register internal to processor core 12 to a location within cache hierarchy 14 that contains the reserved cache line. In addition, reserving processor 10 clears the reservation by resetting the valid bit of its reservation register 15. Thereafter, the process terminates at block 150.

Referring now to block 120, in the event that the cache line targeted by a load-reserve instruction has a remote processing node 8 as its home node, the processor 10 executing the load-reserve instruction requests the cache line specified by the load-reserve instruction from its cache hierarchy 14. If the cache hierarchy 14 cannot service the request, cache hierarchy 14 transmits a request for the cache line on local interconnect 16. If another of the local cache hierarchies 14 holds a copy of the requested cache line as indicated by the coherency responses received by the request transaction, then the data is supplied by the other cache hierarchy 14 by shared or modified intervention. If, however, the request cannot be serviced locally, the local node controller 20 provides an AResp ReRun coherency response to the request transaction and forwards the request transaction to the requested cache line's home node via node interconnect 22. The node controller 20 at the home node responds to the request transaction by obtaining the requested cache line from its local system memory 18, a local cache hierarchy 14, or a remote processing node 8. Once the requested cache line is obtained by the node controller 20 of the home node, DSU 46 within the home node's node controller 20 transmits a data packet containing the requested cache line to the node controller 20 of the requesting node, which in turn transmits the requested cache line to reserving processor 10 in response to the request transaction being reissued on local interconnect 16. Regardless of which of the foregoing scenarios is utilized to supply the requested cache line to the requesting processor 10, the home node's coherence directory 50 will indicate the coherence state of the requested cache line as Shared or Modified at the processing node 8 containing reserving processor 10. In addition, the requested cache line (or a subset thereof) will be loaded into a register within processor core 12 of reserving processor 10, the address of the cache line will be loaded in the address field of the reserving processor's reservation register 15, and the valid bit of reservation register 15 will be set to indicate that reserving processor 10 has a valid reservation.

Following block 120, the process proceeds to block 122, which depicts a determination of whether or not reserving processor 10 has detected a reservation cancelling event, as discussed above with respect to block 92. If not, the process passes to block 130. However, if a reservation cancelling event is detected, reserving processor 10 cancels its reservation by resetting the valid bit of its reservation register 15, as illustrated at block 124, and the process passes to block 130. Importantly, unlike prior art systems, cancellation of a reservation at reserving processor 10, as shown at blocks 94 and 124 of FIG. 3, does not entail communication to global reservation directories in other processing nodes, which consumes bandwidth on node interconnect 22.

Block 130 depicts a determination of whether or not the cache line reserved at block 120 is to be castout of cache hierarchy 14 of the reserving processor 10, for example, due to the operation of the cache line replacement policy (e.g., LRU) of cache hierarchy 14. If not, the process proceeds to block 142, which is described below. However, if the cache line reserved at block 120 is being castout of cache hierarchy 14 of reserving processor 10, the coherence state of the cache line within the reserving processor's cache hierarchy 14 is updated to Invalid, as depicted at block 131. A determination is also made at block 132 whether or not the cache line was held by the cache in Modified or Exclusive state. If not, no further action is required to castout the cache line, and the process passes through page connector A to block 142. If, however, the castout cache line was held in Modified state or Exclusive state by cache hierarchy 14 of reserving processor 10, the cache line will be written back to the home node's system memory 18, as shown at blocks 134 and 136.

Block 134 depicts cache hierarchy 14 of reserving processor 10 writing back the castout cache line by transmitting a Writeback-clean transaction with the cache line to the cache line's home node via local interconnect 16, the local node controller 20, and node interconnect 22. In response to receipt of the Writeback-clean transaction, the home node's node controller 20 updates the home node's system memory 18 with the castout cache line (which may or may not be modified), as depicted at block 136. In addition, the home node's node controller 20 updates the coherence state of the modified cache line in the home node's coherence directory 50 from Modified to Shared. By transitioning from Modified to Shared state rather than Modified to Invalid (as would be done for a Writeback-kill), coherence directory 50 retains an imprecise, conservative indication that a processor 10 at a remote processing node 8 may still retain a reservation for the modified cache line that was written back to the home node. Thus, when the home node's node controller 20 snoops a transaction that should cancel the reserving processor's reservation (which are the same set of transactions that would invalidate a remote cache line), node controller 20 of the home node will forward the transaction to the processing node 8 containing the reserving processor 8 in accordance with the coherence protocol, thereby cancelling the reservation, if any, as discussed above with respect to blocks 122 and 124. As a result of this conservative approach to reservation management, reservation correctness if guaranteed, albeit at the expense of unnecessary bus traffic in scenarios in which transactions are forwarded to remote processing nodes that no longer maintain a reservation.

The process then proceeds from block 136 to block 142, which illustrates a determination of whether or not processor core 12 of reserving processor 10 has initiated execution of a store-conditional instruction in its instruction stream. If not, the process returns to block 122, which has been described. However, if reserving processor 10 has initiated execution of a store-conditional instruction, the process passes to block 144, which depicts reserving processor 10 determining by reference to reservation register 15 whether or not it holds a valid reservation for the cache line specified by the store-conditional instruction. If not, the store-conditional fails, and the process terminates at block 150. If, on the other hand, the reserving processor 10 has a valid reservation for the cache line specified by the store-conditional instruction, the process proceeds to block 146. Block 146 depicts reserving processor 10 performing the store-conditional (once exclusive access to the reserved cache line is assured) by storing the contents of a specified register internal to processor core 12 to a location within cache hierarchy 14 containing the reserved cache line and by resetting the valid bit of reservation register 15. Thereafter, the process terminates at block 150.

As noted above, the conservative approach to reservation management represented by FIG. 3 may entail some unnecessary (and therefore undesirable) traffic across node interconnect 22 in order to guarantee correctness. This unnecessary traffic may be reduced, as discussed below with respect to FIG. 4, through two modifications. First, all processor reservations are made visible on local interconnects 16. That is, no "silent" reservations are permitted. Second, each node controller 20 is equipped with both a local reservation table 62 and logic utilized to handle writebacks of reserved cache lines that are castout.

Figure 4B:
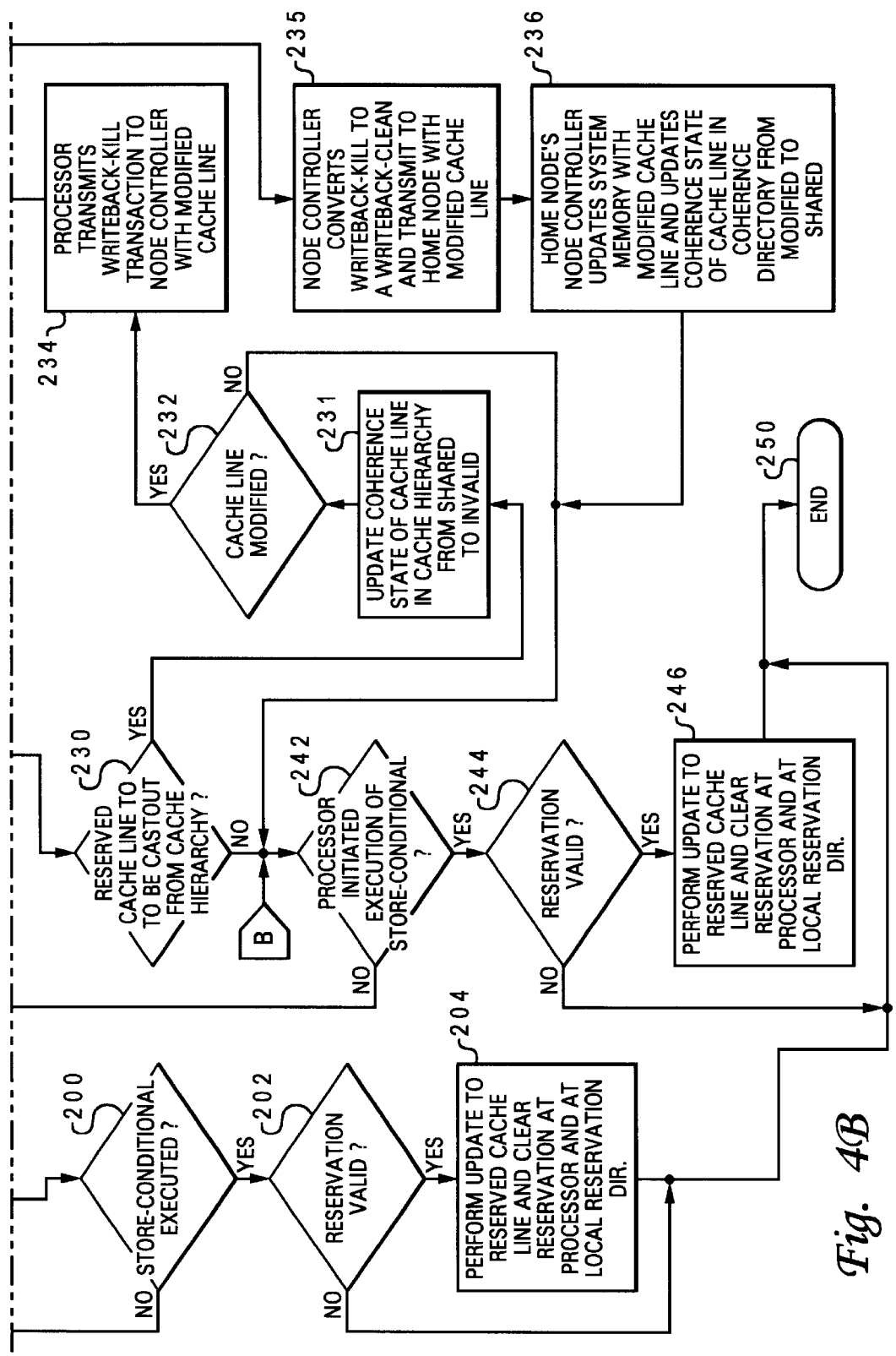
FIG. 4 is a high level logical flowchart of a second exemplary reservation management method in accordance with the present invention.

Referring now to FIG. 4, there is depicted a high level logical flowchart of a second illustrative embodiment of a method for managing reservations in a NUMA computer system in accordance with the present invention. As illustrated, the process begins at block 180 and thereafter proceeds to block 182, which depicts a reserving processor 10 initiating execution of a load-reserve instruction. As indicated at block 184, if reserving processor 10 is located within the home node of the cache line targeted by the load-reserve instruction, the process passes to blocks 190–204; alternatively, if the home node of the cache line targeted by the load-reserve instruction is a remote processing node 8, the process passes to blocks 220–250.

Referring now to block 190, execution of the load-reserve instruction entails a number of steps. First, processor core 12 of reserving processor 10 requests the cache line specified by the load-reserve instruction from its cache hierarchy 14. Cache hierarchy 14 responds to the request by supplying the cache line to processor core 12, as discussed above with respect to block 90 of FIG. 3. Regardless of whether the requested cache line is obtained locally or from a remote processing node 8, once the requested cache line is supplied to reserving processor 10, the requested cache line (or a subset thereof) is then loaded into a register within processor core 12. In addition, the base address of the cache line is stored within the address field of the requesting processor's reservation register 15, and the valid bit is set to indicate that the processor has a reservation for the requested cache line. If obtaining the cache line for which a reservation is sought did not entail sourcing a request transaction on local interconnect 16 (i.e., the requested cache line was resident in cache hierarchy 14), reserving processor 10 also issues a load-reserve transaction on local interconnect 16 to ensure visibility of the reservation. In response to snooping the load-reserve transaction, TSU 42 of local node controller 20 enters the reservation in local reservation table 62. The reservation preferably indicates both the processor having the reservation and the base physical address of the reserved cache line.

Following execution of the load-reserve instruction at block 190, the process proceeds to block 192, which illustrates a determination of whether or not reserving processor 10 has detected an event that would cancel the reservation. If a reservation cancelling event is detected by reserving processor 10, the process proceeds to block 194, which depicts reserving processor 10 cancelling its reservation by resetting the valid bit within its reservation register 15. In addition, the reservation recorded within local reservation table 62 is cancelled either in response to node controller 20 snooping a reservation cancelling transaction on local interconnect 16 or in response to a transaction issued on local interconnect 16 by reserving processor 10. The process then passes to block 200. If, on the other hand, a determination is made at block 192 that a reservation cancelling event has not been detected, the process proceeds directly to block 200.

Block 200 illustrates a determination of whether or not reserving processor 10 has initiated execution of a store-conditional instruction. If not, the process returns to block 192, which has been described. If, however, reserving processor 10 has initiated execution of a store-conditional instruction, the process passes to block 202, which depicts reserving processor 10 determining by reference to its reservation register 15 whether or not it holds a valid reservation for the cache line specified by the store-conditional instruction. If not, the store-conditional fails, and the process terminates at block 250. If, on the other hand, reserving processor 10 has a valid reservation for the cache line specified by the store-conditional instruction, process passes to block 204. Block 204 illustrates reserving processor 10 updating the reserved cache line (once exclusive access to the reserved cache line is assured) by storing the contents of a specified register internal to processor core 12 to a location within cache hierarchy 14 containing the reserved cache line. The reservation is then cleared at both reserving processor 10 (by resetting the valid bit of reservation register 15) and within local reservation table 62. Thereafter, the process terminates at block 250.

Referring again to block 184, in the event that the cache line targeted by a load-reserve instruction has a remote processing node 8 as its home node the process passes to block 220. Block 220 depicts the execution of the load-reserve by reserving processor 10, which as described above entails reserving processor 10 requesting the cache line specified by the load-reserve instruction from its cache hierarchy 14. Cache hierarchy 14 responds to the request by supplying the requested cache line to reserving processor 10, possibly after initiating transactions on local interconnect 16 and/or node interconnect 22, as discussed above with respect to block 120 of FIG. 3. Regardless of how the requested cache line is supplied to the requesting processor 10, the home node's coherence directory 50 will indicate the coherence state of the requested cache line as Shared or Modified at the processing node 8 containing reserving processor 10. In addition, the requested cache line (or a subset thereof) will be loaded into a register within processor core 12 of reserving processor 10, the address of the cache line will be loaded in the address field of the reserving processor's reservation register 15, and the valid bit of reservation register 15 will be set to indicate that reserving processor 10 has a valid reservation. In addition, the reservation will be recorded in local reservation table 62, as discussed above with respect to block 190.

Following block 220, the process proceeds to block 222, which depicts a determination of whether or not reserving processor 10 has detected a reservation cancelling event, as discussed above with respect to block 92 of FIG. 3. If not, the process passes directly to block 230. However, if a reservation cancelling event is detected by reserving processor 10, reserving processor 10 cancels its reservation at block 224 by resetting the valid bit of reservation register 15 and cancelling the reservation within local reservation table 62. The process then passes to block 230.

Block 230 depicts a determination of whether or not the cache line reserved at block 220 is to be castout of cache hierarchy 14 of the reserving processor 10, for example, due to the operation of the cache line replacement policy (e.g., LRU) of cache hierarchy 14. If not, the process proceeds to block 242, which is described below. However, if the cache line reserved at block 220 is being castout of cache hierarchy 14 of reserving processor 10, the coherence state of the cache line within the reserving processor's cache hierarchy 14 is updated to Invalid, as depicted at block 231. A determination is also made at block 232 whether or not the castout cache line was modified. If not, no further action is required to castout the cache line, and the process passes to block 242. If, however, the castout cache line was held in Modified state by cache hierarchy 14 of reserving processor 10, the process proceeds to block 234, which depicts reserving processor 10 transmitting a Writeback-kill transaction with the modified cache line to the local node controller 20 via local interconnect 16. As illustrated at block 233, a determination is then made by TSU 42 of local node controller 20 whether or not local reservation table 62 indicates that reserving processor 10 has a valid reservation for the castout cache line. If the reserving processor's reservation for the modified cache line has been cancelled at block 224, local node controller 20 transmits the Writeback-kill transaction and the modified cache line to the home node's node controller 20 via node interconnect 22, as shown at block 237. In response to receipt of the Writeback-kill transaction, node controller 20 at the home node updates the home node's system memory 18 with the modified cache line data, as depicted at block 238. In addition, the home node's node controller 20 updates the coherency state of the cache line within the home node's coherence directory 50 from Modified to Invalid. The process then passes through page connector B to block 242.

Returning to block 233, if TSU 42 of local node controller 20 determines that the reserving processor's reservation for the castout cache line is still valid, the process passes to block 235, which depicts TSU 42 of local node controller 20 converting the Writeback-kill transaction received from reserving processor 10 into a Writeback-clean transaction and transmitting the Writeback-clean transaction with the modified cache line to the home node's node controller 20 via node interconnect 22. As illustrated at block 236, in response to receipt of the Writeback-clean transaction, the home node's node controller 20 updates the home node's system memory 18 with the modified cache line. In addition, the home node's node controller 20 updates the coherence state of the modified cache line in the home node's coherence directory 50 from Modified to Shared. As discussed above, the Shared state in coherence directory 50 will cause the home node's node controller 20 to forward snooped transactions to the processing node 8 containing reserving processor 10 in accordance with the cache coherence protocol. In this manner, forwarded transactions that would invalidate the reserved cache line at reserving processor 10 serve to cancel the reservation maintained by reserving processor 10. The process then passes from block 236 to block 242.

Block 242 illustrates a determination of whether or not processor core 12 of reserving processor 10 has initiated execution of a store-conditional instruction in its instruction stream. If not, the process returns to block 222, which has been described. However, if reserving processor 10 has initiated execution of a store-conditional instruction, the process proceeds to block 244, which depicts reserving processor 10 determining by reference to its reservation register 15 whether or not it holds a valid reservation for the cache line specified by the store-conditional instruction. If not, the store-conditional fails, and the process terminates at block 250. If, on the other hand, reserving processor 10 has a valid reservation for the cache line specified by the store-conditional instruction, as indicated by a set valid bit within reservation register 15, the process proceeds to block 246. Block 246 illustrates reserving processor 10 performing the store-conditional (once exclusive access to the reserved cache line is assured) by storing the contents of a specified register internal to processor core 12 to a location within cache hierarchy 14 containing the reserved cache line. Thereafter, the reservation is cleared at both reserving processor 10 and local reservation table 62, and the process terminates at block 250.

As has been described, the present invention provides an improved method and system for reservation management in a NUMA computer system. In accordance with the present invention, each processing node's coherence directory maintains indications of the possible coherency states of cache lines checked out from the processing node's system memory to cache hierarchies in other processing nodes. In order to keep track of possibly valid reservations for modified cache lines castout from remote cache hierarchies, the coherence directory updates the coherence state of each castout cache line written back from a remote processing node with a Writeback-clean transaction from Modified to Shared state. In this manner, transactions that require the cancellation of reservations, which are the same set of transaction that would require the invalidation of remote copies of a cache line according to the cache coherence protocol, are forwarded from the home node to all remote processing nodes containing processors holding reservations for the targeted cache lines. In response to snooping such forwarded transactions, the processors holding reservations for the relevant cache lines, if any, each cancel their respective reservation. In each of the disclosed embodiments, reservations in a NUMA computer system are appropriately cancelled in all cases. In a first embodiment, maintaining reservation correctness at all times comes at the minor expense of unnecessary traffic on the node interconnect in a statistically small number of processing scenarios in which the home node forwards a transaction to a remote processing node to cancel a reservation that has already been cancelled. In the second embodiment, such unnecessary traffic is eliminated by incorporating additional logic in the node controller that manages the writeback of castout cache lines to the home node.

While the invention has been particularly shown and described with reference to a preferred embodiment, it will be understood by those skilled in the art that various changes in form and detail may be made therein without departing from the spirit and scope of the invention.

What is claimed is:

1. A method of reservation management in a multiprocessor computer system including a remote processing node and a home processing node coupled to said node interconnect, wherein said remote processing node includes a processor having an associated cache hierarchy and said home processing node includes a shared system memory containing a plurality of memory granules and a coherence directory that indicates possible coherence states of remote copies of said plurality of mimory granules, said method comprising:

at said remote processing node, maintaining a reservation, for said processor, reserving a mimory granule among said plurality of memory granules that is not resident within said associated cache hierarchy; and while said mimory granule is not resident within said associated cache hierarchy, setting a coherence indicator within said coherence directory of said home processing node to a state indicating that said reserved memory granule is possibly held non-exclusively at said remote processing node, such that cache coherence communication will reset said reservation if necessary.

2. The method of claim 1, and further comprising:

storing said memory granule in said associated cache hierarchy;

setting said reservation at said remote processing node;

setting said coherence indicator to a state indicating that said memory granule is held only at said remote processing node; and thereafter, deallocating said memory granule from said associated cache hierarchy and writing back said memory granule to said shared system memory.

3. The method of claim 2, wherein writing back said memory granule comprises transmitting a writeback transaction from said remote processing node to said home processing node, wherein said writeback transaction indicates that said coherence indicator should be updated to shared state.

4. The method of claim 3, said remote processing node further including a node controller, wherein writing back said memory granule further comprises:

transmitting a writeback transaction to said node controller that indicates that said coherence indicator should be updated to invalid state; and in response to receipt of said writeback transaction at said node controller, converting said writeback transaction prior to transmission of said writeback transaction to said home processing node, wherein said converted writeback transaction indicates that said coherence indicator should be updated to shared state.

5. The method of claim 4, wherein said conversion is performed only if said memory granule is modified with respect to said shared system memory and said reservation is valid.

6. The method of claim 1, and further comprising:

in response to receipt of a transaction at said home processing node indicating an update to said memory granule, forwarding said transaction from said home processing node to said remote processing node; and in response to receipt of said forwarded transaction at said remote processing node, cancelling said reservation if said reservation is valid; and updating said coherence indicator to an invalid state.

7. The method of claim 1, wherein setting said coherence indicator comprises setting said state on response to a writeback of said reserved memory granule to said home processing node by said remote processing node.

8. A computer system, comprising:

a node interconnect; and a plurality of processing nodes coupled to said node interconnect, wherein said plurality of processing nodes include at least a remote processing node and a home processing node, said remote processing node including a processor having an associated cache hierarchy and said home processing node including:

a shared system memory containing a plurality of memory granules; and a coherence directory that indicates possible coherence states of copies of memory granules among said plurality of memory granules that are stored within at least one processing node other than said home processing node;

a controller that, while said processor has a reservation for a memory granule among said plurality of memory granules that is not resident within said cache hierarchy, sets a coherence indicator to a state indicating that said reserved memory granule is possibly held non-exclusively at said remote processing node, such that cache coherence communication will reset said reservation if necessary.

9. The computer system of claim 8, wherein said controller updates said coherence indicator from a state indicating that said memory granule is held only at said remote processing node to said state indicating that said reserved memory granule is possibly held non-exclusively at said remote processing node in response to receipt from said remote processing node of a writeback transaction specifying said memory granule.

10. The computer system of claim 9, wherein said writeback transaction indicates that said coherence indicator should be updated to shared state.

11. The computer system of claim 9, said remote processing node further including a node controller that receives said writeback transaction from said processor, said writeback transaction indicating that said coherence indicator should be updated to invalid state, wherein said node controller converts said writeback transaction prior to transmitting said writeback transaction to said home processing node, such that said converted writeback transaction indicates that said coherence indicator should be updated to shared state.

12. The computer system of claim 11, wherein said node controller performs said conversion only if said memory granule is modified with respect to said shared system memory and said reservation is valid.

13. The computer system of claim 8, wherein said computer system further comprises:

means, responsive to receipt of a transaction at said home processing node indicating an update to said memory granule, for forwarding said transaction from said home processing node to said remote processing node;

means, responsive to receipt of said forwarded transaction at said remote processing node, for cancelling said reservation if said reservation is valid; and wherein said controller updates said coherence indicator to an invalid state in response to receipt of a transaction at said home processing node indicating an update to said memory granule.

14. A home processing node for a multi-node computer system containing a remote processing node including a processor having an associated cache hierarchy, said home processing node comprising:

a shared system memory containing a plurality of memory granules;

a coherence directory that indicates possible coherence states of copies of memory granules among said plurality of memory granules that are stored within at least one processing node other than said home processing node; and a controller that, while said processor has a reservation for a memory granule among said plurality of memory granules that is not resident within said cache hierarchy, sets a coherence indicator to a state indicating that said reserved memory granule is possibly held non-exclusively at said remote processing node, such that cache coherence communication will reset said reservation if necessary.

15. The home processing node of claim 14, wherein said controller updates said coherence indicator from a state indicating that said memory granule is held only at said remote processing node to said state indicating that said reserved memory granule is possibly held non-exclusively at said remote processing node in response to receipt from said remote processing node of a writeback transaction specifying said memory granule.

16. The home processing node of claim 15, wherein said writeback transaction indicates that said coherence indicator should be updated to shared state.

17. The home processing node of claim 14, said controller further comprising:

means, responsive to receipt of a transaction at said home processing node indicating an update to said memory granule, for forwarding said transaction from said home processing node to said remote processing node;

means for updating said coherence indicator from said state indicating that said reserved memory granule is possibly held non-exclusively by said remote processing node to an invalid state in response to receipt of a transaction at said home processing node indicating an update to said memory granule.

18. A remote processing node for a multi-node computer system, wherein said multi-node computer system contains a home processing node including a shared system memory containing a plurality of memory granules and a coherence directory that indicates possible coherence states of copies of memory granules that are stored within at least one processing node other than said home processing node, said remote processing node comprising:

a processor having an associated cache hierarchy; and a node controller that receives a writeback transaction from said processor, said writeback transaction indicating that a coherence indicator in said home processing node associated with a memory granule should be updated to invalid state, wherein said node controller converts said writeback transaction prior to transmitting said writeback transaction to said home processing node, such that said converted writeback transaction indicates that said coherence indicator should be updated to shared state.

19. The remote processing node of claim 18, wherein said node controller performs said conversion only if said memory granule is modified with respect to said shared system memory and if said processor has a valid reservation for the memory granule.

* * * * *

UNITED STATES PATENT AND TRADEMARK OFFICE
CERTIFICATE OF CORRECTION

PATENT NO. : 6,275,907 B1
DATED : August 14, 2001
INVENTOR(S) : Baumgartner et al.

It is certified that error appears in the above-identified patent and that said Letters Patent is hereby corrected as shown below:

Column 15,
Line 65, delete the word "mimory" and replace it with the word -- memory --.

Column 16,
Line 1, delete the word "mimory" and replace it with the word -- memory --.

Signed and Sealed this

Seventh Day of May, 2002

Attest:

JAMES E. ROGAN
Attesting Officer
Director of the United States Patent and Trademark Office